US009646366B2

(12) United States Patent
Rizi et al.

(10) Patent No.: US 9,646,366 B2
(45) Date of Patent: May 9, 2017

(54) METHOD AND APPARATUS FOR ENHANCING MEDICAL IMAGES

(71) Applicant: McKesson Financial Holdings, Hamilton (BM)

(72) Inventors: Azadeh Yazdan Panah Gohar Rizi, Vancouver (CA); Mahmoud Ramze Rezaee, Vancouver (CA)

(73) Assignee: Change Healthcare LLC, Alpharetta, GA (US)

( * ) Notice: Subject to any disclaimer, the term of this patent is extended or adjusted under 35 U.S.C. 154(b) by 718 days.

(21) Appl. No.: 13/690,978

(22) Filed: Nov. 30, 2012

(65) Prior Publication Data

US 2014/0153793 A1 Jun. 5, 2014

(51) Int. Cl.
*G06K 9/00* (2006.01)
*G06K 9/40* (2006.01)
*G06T 5/00* (2006.01)
*G06T 5/40* (2006.01)

(52) U.S. Cl.
CPC ............... *G06T 5/004* (2013.01); *G06T 5/40* (2013.01); *G06T 2207/10116* (2013.01); *G06T 2207/20012* (2013.01); *G06T 2207/30008* (2013.01); *G06T 2207/30061* (2013.01)

(58) Field of Classification Search
CPC . G06T 2207/10116; G06T 2207/20012; G06T 2207/30008; G06T 2207/30061; G06T 5/004; G06T 5/00; G06T 5/001; G06T 5/002; G06T 5/003; G06T 5/40
See application file for complete search history.

(56) References Cited

U.S. PATENT DOCUMENTS

| | | | | |
|---|---|---|---|---|
| 5,001,573 A | * | 3/1991 | Sakamoto | G06T 5/004 358/447 |
| 5,038,388 A | * | 8/1991 | Song | G06T 5/20 382/266 |
| 5,471,987 A | * | 12/1995 | Nakazawa | G06T 5/20 128/925 |
| 5,671,359 A | * | 9/1997 | Godlewski | G06F 19/321 705/3 |

(Continued)

OTHER PUBLICATIONS

Polesel et al ("Adaptive Unsharp Masking for Contrast Enhancement", 1997).*

(Continued)

*Primary Examiner* — Avinash Yentrapati
(74) *Attorney, Agent, or Firm* — Alston & Bird LLP

(57) ABSTRACT

A method, apparatus and computer program product are provided to enhance medical images by utilizing an enhancement function in order to permit a user to more efficiently and effectively read the medical images and provide diagnostic or other information based upon the enhanced images. In the context of a method, a medical image is received that has a plurality of pixels with respective pixel values. The method also enhances the medical image utilizing an enhancement function. The enhancement function varies depending upon the pixel value of a respective pixel. For example, the enhancement function of one embodiment may be a piecewise function. As such, the method enhances the medical image by modifying a representation of the medical image in accordance with the enhancement function.

21 Claims, 5 Drawing Sheets

(56) References Cited

U.S. PATENT DOCUMENTS

| | | | | |
|---|---|---|---|---|
| 5,857,033 A * | 1/1999 | Kim | ............... | G06T 5/009 382/168 |
| 5,880,767 A * | 3/1999 | Liu | ............... | G06T 5/20 347/251 |
| 6,125,194 A * | 9/2000 | Yeh | ............... | G06F 19/321 382/132 |
| 6,167,165 A * | 12/2000 | Gallagher | ............... | H04N 1/58 382/263 |
| 6,285,798 B1 * | 9/2001 | Lee | ............... | G06T 5/004 382/260 |
| 6,424,730 B1 * | 7/2002 | Wang | ............... | G06T 5/004 128/922 |
| 6,480,300 B1 * | 11/2002 | Aoyama | ............... | G06T 5/004 358/1.9 |
| 6,728,003 B1 * | 4/2004 | Gallagher | ............... | G06T 5/004 358/1.9 |
| 7,218,763 B2 * | 5/2007 | Belykh | ............... | G06T 5/007 382/128 |
| 8,218,868 B2 * | 7/2012 | Stern | ............... | G06T 5/009 382/168 |
| 2001/0046320 A1 * | 11/2001 | Nenonen | ............... | G06T 5/004 382/169 |
| 2002/0126327 A1 * | 9/2002 | Edgar | ............... | G06T 5/004 358/517 |
| 2003/0228064 A1 * | 12/2003 | Gindele | ............... | G06T 5/007 382/260 |
| 2004/0042679 A1 * | 3/2004 | Yamada | ............... | G06T 5/004 382/260 |
| 2004/0131273 A1 * | 7/2004 | Johnson | ............... | G06T 5/008 382/254 |
| 2004/0136570 A1 * | 7/2004 | Ullman | ............... | G09B 21/008 382/114 |
| 2007/0188623 A1 * | 8/2007 | Yamashita | ............... | G06T 5/004 348/222.1 |
| 2008/0205785 A1 * | 8/2008 | Geiger | ............... | G06T 5/20 382/260 |
| 2008/0304695 A1 * | 12/2008 | Holm | ............... | G06T 5/009 382/100 |
| 2012/0275658 A1 * | 11/2012 | Hurley | ............... | G06T 7/0004 382/109 |
| 2013/0114853 A1 * | 5/2013 | Sengupta | ............... | G06K 9/00248 382/103 |

OTHER PUBLICATIONS

Fan et al., *Contrast Enhancement by Multiscale and Nonlinear Operators*, 1996, 30 pages.

* cited by examiner

METHOD AND APPARATUS FOR ENHANCING MEDICAL IMAGES

TECHNOLOGICAL FIELD

A method, apparatus and computer program product are provided in accordance with an example embodiment in order to enhance medical images and, more particularly, to enhance medical images utilizing an enhancement function.

BACKGROUND

Medical imaging often includes images of regions of the human body for clinical purposes, such as examination, diagnosis and/or treatment. These images may be acquired by a number of different imaging modalities including for example, ultrasound (US), magnetic resonance (MR), positron emission tomography (PET), computed tomography (CT), mammography (MG), digital radiography (DR), computed radiography (CR) or the like. In a number of example medical imaging workflows, such as in the case of a Picture Archiving and Communication System (PACS), an image study for a patient may include one or more acquired images of the patient along with information that may reside with or otherwise accompany the images.

In order to efficiently and effectively read the medical images, the quality of a medical image should be relatively high. However, the raw image data that is captured, particularly for projection modalities such as DR, CR or MG, may not be of sufficient quality. In this regard, the quality of the raw image data may be dependent upon the quality of the acquisition device, the image capture parameters, the modality type, the technologist's experience, patient variability, the display hardware, the image software and other workflow-related issues. As such, the raw image data may undergo image enhancement processing, such as performed by a quality assurance (QA) workstation. A QA workstation may enhance the image represented by the raw image data by applying one or more different image enhancement techniques.

Image enhancement techniques may be applied with each image enhancement technique designed with a particular objective, such as contrast, noise removal, detail visibility or reconstruction of the original signal. One image enhancement technique utilizes unsharp masking. In unsharp masking, a fraction of the high frequency components of the medical image are added to the original signal. In this regard, a blurred version of the medical image may be subtracted from the medical image itself to create an unsharp mask. Using the mask, the contrast of neighboring pixels may be increased by an amplification amount k. The amplification amount k may be a predefined value that may be, for example, specified by the user to a single value selected from the range of (0 1]. However, unsharp masking enhances both the low and high contrast areas by the same amount of amplification k. For at least some medical images, the enhancement of both the low and high contrast areas by the same amount does not sufficiently enhance the medical image. By way of example, the unsharp masking of an image of a chest X-ray of a patient with pneumothorax, e.g., a collapsing lung, may amplify the lower contrast area proximate the edge of the lung to the same degree as the rib transition to the background such that the edge of the lung remains of lower contrast than would be desired as shown in FIG. 1.

Following the image enhancement of the raw image data, the resulting images may be provided to a PACS for display and review. Depending upon the type of equipment utilized to capture the image and the availability and quality of the QA software that performs the initial image enhancement processing of the raw image data, the PACS may still receive images that are of less than a desired quality and which therefore require additional image enhancement. In an instance in which a user of the PACS, such as a radiologist, is unsatisfied with the quality of the images, the images may again be processed at the QA workstation utilizing different parameters in conjunction with the image enhancement algorithms prior to again being provided to the PACS for further review. Such additional image enhancement processing may create workflow issues and delay the diagnostic process.

Some PACS may also include basic filter processing, such as de-noising and image sharpening. Nonetheless, at least some medical images still have a lower quality than would be desired even after the image enhancement and filter processing. For example, following image enhancement and filter processing, some medical images of certain parts of the anatomy may still have an insufficient contrast and insufficient visibility.

BRIEF SUMMARY

A method, apparatus and computer program product are provided in accordance with an example embodiment in order to enhance medical images. In his regard, the method, apparatus and computer program product of an example embodiment may increase the contrast and/or enhance the visibility of certain parts of the anatomy, such as by amplifying different tissue structures in different manners, by utilizing an enhancement function. Thus, the method, apparatus and computer program product of an example embodiment may permit a user, such as a radiologist, to more efficiently and effectively read the medical images and provide diagnostic or other information based upon the enhanced images.

In one embodiment, a method of enhancing medical images is provided that includes receiving a medical image having a plurality of pixels with respective pixel values. The method of this embodiment also includes enhancing, with processing circuitry, the medical image utilizing an enhancement function. The enhancement function varies depending upon the pixel value of a respective pixel. For example, the enhancement function of one embodiment may be a piecewise function, such as a piecewise function having a plurality of pieces associated with different respective pixel values. As such, the method of this embodiment enhances the medical image by modifying a representation of the medical image in accordance with the enhancement function.

The method of one embodiment may also include creating a blurred image of the medical image. In this embodiment, the method may modify a representation of the medical image by modifying the blurred image in accordance with the enhancement function to create an enhanced blurred image. The method of this embodiment may also include combining the medical image and the enhanced blurred image to create a sharpened image. In one embodiment, the method may determine a cumulative histogram distribution of the sharpened image. The method of this embodiment may also rescale the sharpened image to correspond to an intensity range of the medical image and/or eliminate one or more outlier pixels as defined by the cumulative histogram distribution. The method of one embodiment may also include applying a contrast limited adapted histogram equalization function to the sharpened image.

In another embodiment, an apparatus for enhancing medical images is provided. The apparatus of this embodiment includes processing circuitry configured to receive a medical image having a plurality of pixels with respective pixel values. The processing circuitry is also configured to enhance the medical image utilizing an enhancement function. The enhancement function varies depending upon the pixel value of a respective pixel. For example, the enhancement function may be a piecewise function, such as a piecewise function that includes a plurality of pieces associated with different respective pixel values. The processing circuitry of this embodiment is also configured to enhance the medical image by modifying a representation of the medical image in accordance with the enhancement function.

The processing circuitry of one embodiment may be further configured to create a blurred image of the medical image. In this embodiment, the processing circuitry may be configured to modify a representation of the medical image by modifying the blurred image in accordance with the enhancement function to create an enhanced lured image. The processing circuitry of this embodiment is also configured to combine the medical image and the enhanced blurred image to create a sharpened image. In one embodiment, the processing circuitry is further configured to determine a cumulative histogram distribution of the sharpened image and to then either rescale the sharpened image to correspond to an intensity range of the medical image and/or to eliminate one or more outlier pixels as defined by the cumulative histogram distribution. The processing circuitry of one embodiment may also be configured to apply a contrast limited adaptive histogram equalization function to the sharpened image.

In a further embodiment, a computer program product is provided for enhancing medical images. The computer program product includes at least one non-transitory computer-readable storage medium having computer-executable program code portions stored therein with the computer-executable program code portions including program code instructions for receiving a medical image having a plurality of pixels with respective pixel values. The computer-executable program code portions also include program code instructions for enhancing the medical image utilizing an enhancement function. The enhancement function varies depending upon the pixel value of a respective pixel. For example, the enhancement function may be a piecewise function. In this embodiment, the program code instructions for enhancing the medical image also include program code instructions for modifying a representation of the medical image in accordance with the enhancement function.

The computer-executable program code portion of one embodiment also includes program code instructions for creating a blurred image of the medical image. In this embodiment, the program code instructions for modifying a representation of the medical image include program code instructions for modifying the blurred image in accordance with the enhancement function to create an enhanced blurred image. The computer-executable program code portions of this embodiment may also include program code instructions for combining the medical image and the enhanced blurred image to create a sharpened image. The computer-executable program code portions of one embodiment may also include program code instructions for determining a cumulative histogram distribution of the sharpened image and for resealing the sharpened image to correspond to an intensity range of the medical image and/or for eliminating one or more outlier pixels as defined by the cumulative histogram distribution. The computer-executable program code portions of one embodiment may also include program code instructions for applying a contrast limited adaptive histogram equalization function.to the sharpened image.

BRIEF DESCRIPTION OF THE DRAWINGS

Figure 1:
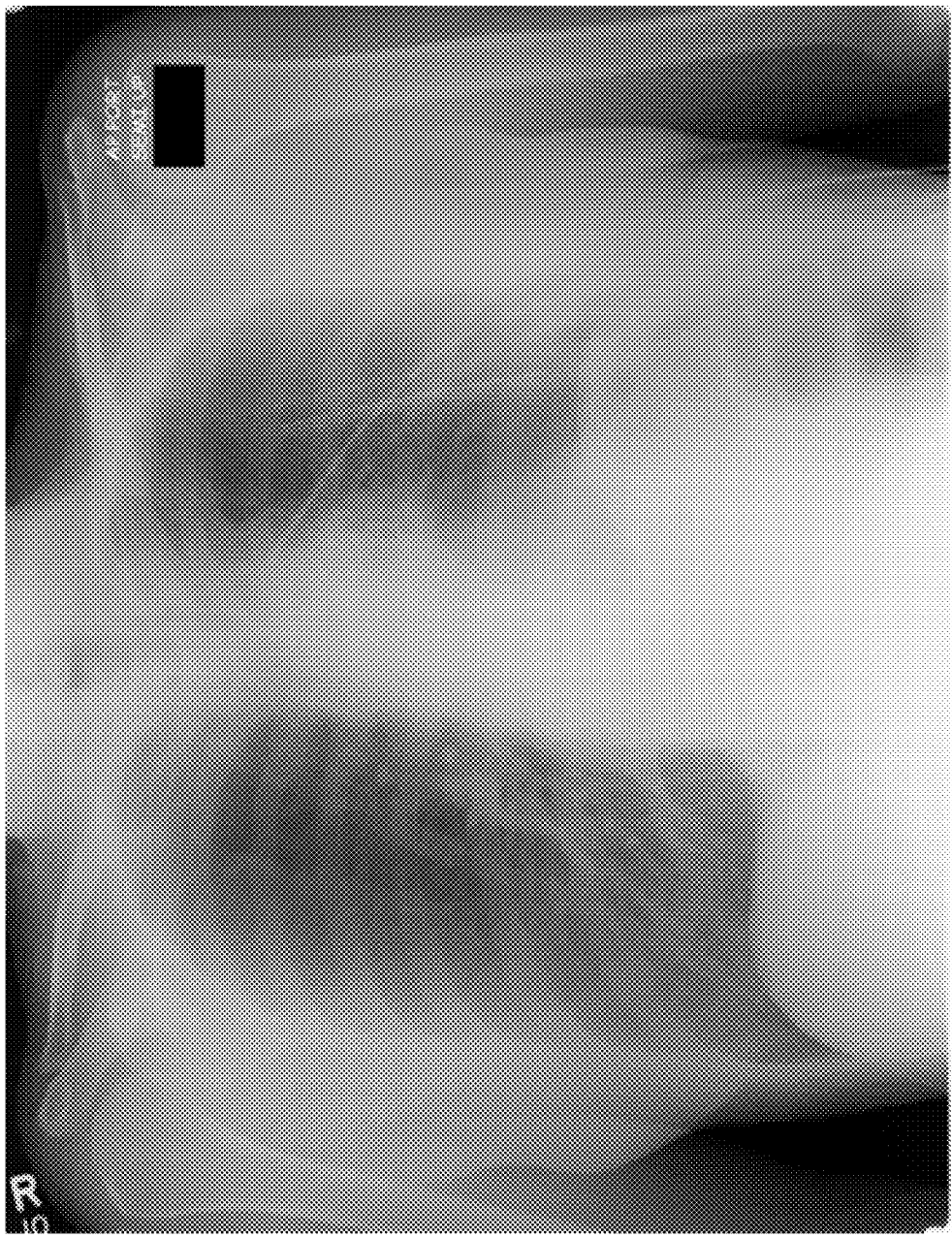

Having thus described certain example embodiments of the present disclosure in general terms, reference will now be made to the accompanying drawings, which are not necessarily drawn to scale, and wherein:

FIG. 1 is a conventional image of a chest x-ray of a patient with pneumothorax.

Figure 2:
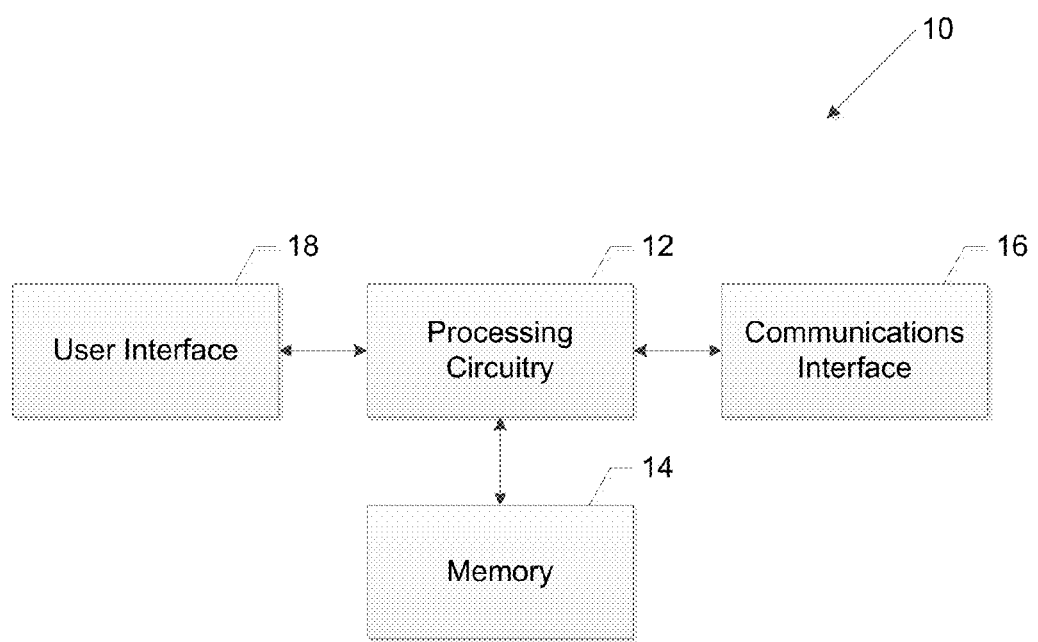
Figure 3:
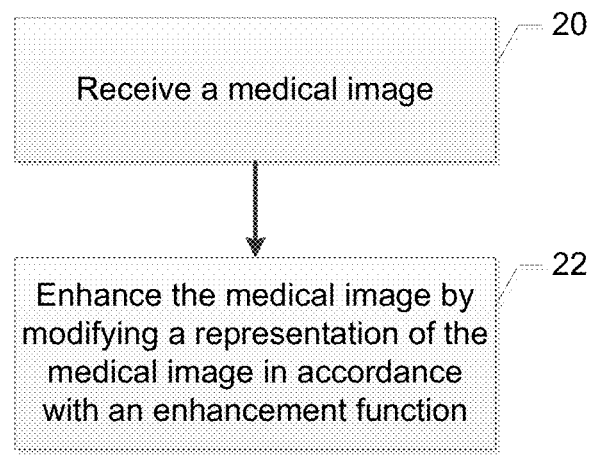
Figure 4:
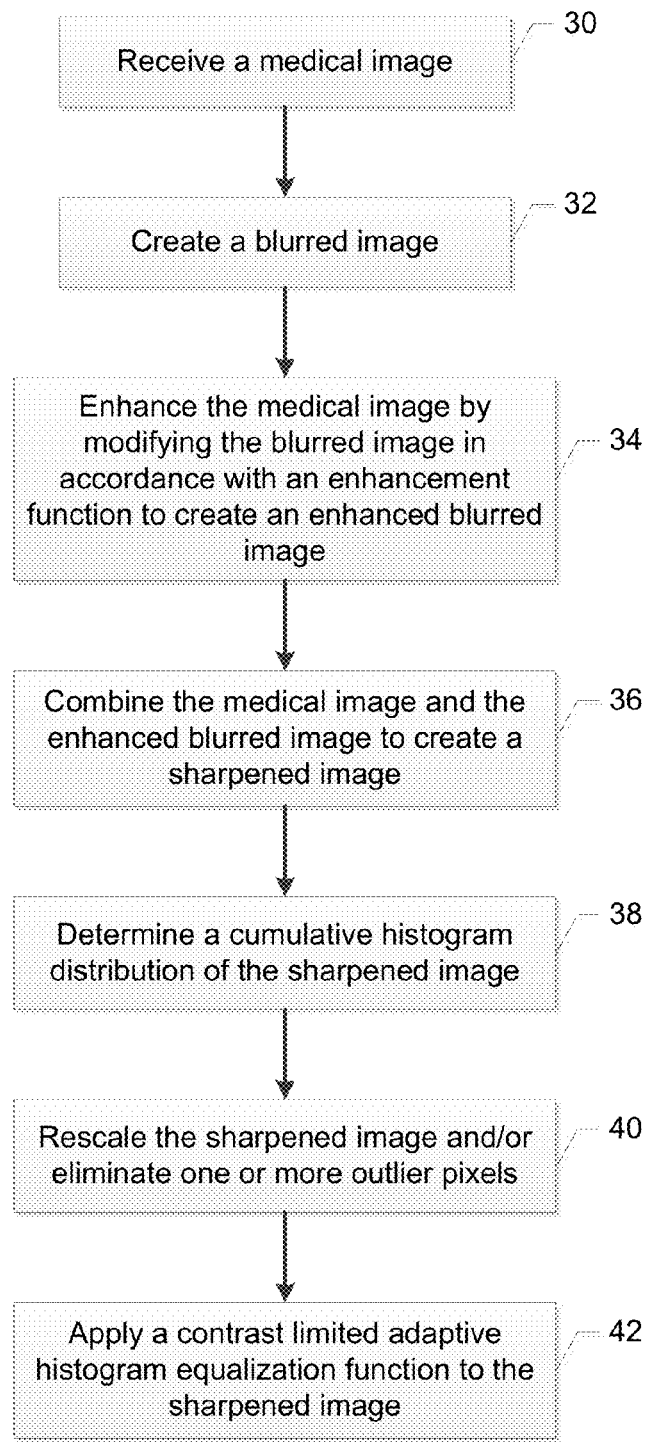
Figure 5:
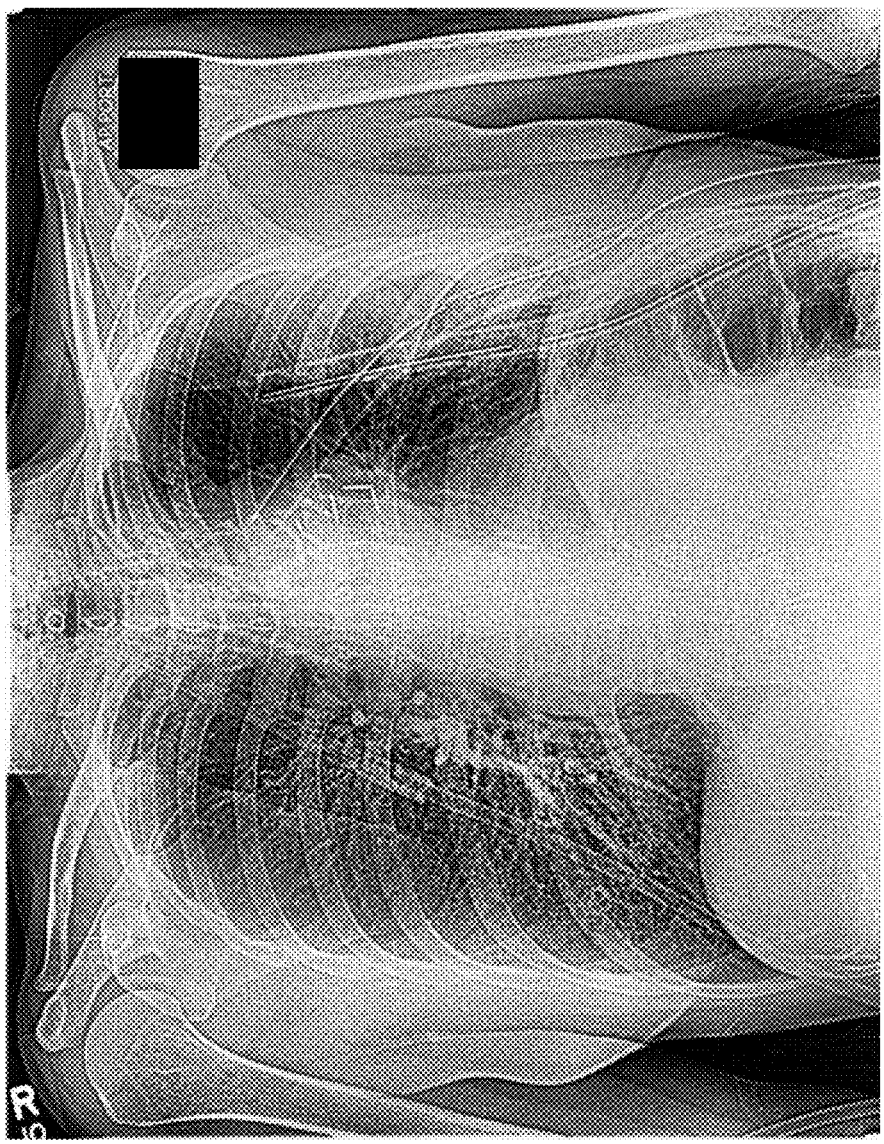

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a more detailed flowchart of the operations performed, such as by the apparatus of FIG. 2, in accordance with an example embodiment of the present invention; and FIG. 5 is a sharpened image of a chest x-ray of the patient with pneumothorax of FIG. 1 following enhancement of the image in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Further, the apparatus and method of example embodiments of the present invention will be primarily described in conjunction with medical-imaging applications. It should be understood, however, that the apparatus and method may be utilized in conjunction with a variety of other applications, both in the medical industry and outside the medical industry. Like numbers refer to like elements throughout.

A method, apparatus and computer program product are provided in accordance with an example embodiment in order to enhance medical images. The medical images may be any of a wide variety of medical images captured by various modalities, such as projection modalities including DR, CR and MG images. Additionally, the medical images may be images of any of a variety of parts of a patient's anatomy. A method, apparatus and computer program product of an example embodiment may be embodied by or otherwise associated with a PACS in one example embodiment. However, the method, apparatus and computer program product may be embodied or otherwise associated with other types of imaging systems in other embodiments. For purposes of illustration, but not of limitation, a method, apparatus and computer program product of an example embodiment will hereinafter be described, however, as being embodied or otherwise associated with a PACS system.

Regardless of the type of imaging system that embodies or is otherwise associated with the method, apparatus and computer program product, |the apparatus $10|_{[e1]}$of one embodiment is depicted in FIG. 2. In some example embodiments, the apparatus includes various means for performing the various functions described herein. These means may include, for example, one or more of a processing circuitry 12, memory 14, communication interface 16 and/or user interface 18 for performing the various functions herein described. The means of the apparatus as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processing circuitry), or some combination thereof.

The processing circuitry 12 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processing circuitry, in some embodiments the processor may comprise a plurality of processors. The plurality of processors may be embodied on a single computing device or may be distributed across a plurality of computing devices collectively configured to function as the apparatus. The plurality of processors may be in operative communication with each other and may be collectively configured to perform one or more functionalities of the apparatus as described herein. In some example embodiments, the processing circuitry is configured to execute instructions stored in the memory 14 or otherwise accessible to the processing device. These instructions, when executed by the processing circuitry, may cause the apparatus 10 to perform one or more of the functionalities of the apparatus as described herein. As such, whether configured by hardware or software methods, or by a combination thereof, the processing circuitry may comprise an entity capable of performing operations according to embodiments of the present invention while configured accordingly. Thus, for example, when the processing circuitry is embodied as an ASIC, FPGA or the like, the processing circuitry may comprise specifically configured hardware for conducting one or more operations described herein. Alternatively, as another example, when the processing circuitry is embodied as an executor of instructions, such as may be stored in the memory, the instructions may specifically configure the processing circuitry to perform one or more algorithms and operations described herein.

The memory 14 may include, for example, volatile and/or non-volatile memory. Although illustrated in FIG. 2 as a single memory, the memory may comprise a plurality of memories. The plurality of memories may be embodied on a single computing device or distributed across a plurality of computing devices. The memory may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory may comprise any non-transitory computer readable storage medium. The memory may be configured to store information, data, applications, instructions, or the like for enabling the apparatus 10 to carry out various functions in accordance with example embodiments of the present invention. For example, in some example embodiments, the memory is configured to buffer input data for processing by the processing circuitry 12. Additionally or alternatively, in some example embodiments, the memory is configured to store program instructions for execution by the processing circuitry.

The communication interface 16 may be embodied as any device or means embodied in circuitry, hardware, a computer program product comprising computer readable program instructions stored on a computer readable medium (e.g., the memory 14) and executed by the processing circuitry 12, or a combination thereof that is configured to receive and/or transmit data from/to another device, such as, for example, a touch sensitive input device, e.g., a touch sensitive mouse. In some example embodiments, the communication interface is at least partially embodied as or otherwise controlled by the processing circuitry. In this regard, the communication interface may be in communication with the processing circuitry, such as via a bus. The communication interface may provide for communications via a wireline connection or may support wireless communications in which the communication interface may include, for example, an antenna, a transmitter, a receiver, a transceiver and/or supporting hardware or software for enabling communications, such as with a touch sensitive input device. The communication interface may be configured to receive and/or transmit data using any protocol that may be used for communications between computing devices. As an example, the communication interface may be configured to receive and/or transmit data using any protocol and/or communications technology that may be used for communicating with the other devices. The communication interface may additionally be in communication with the memory and/or user interface 18, such as via a bus.

The user interface 18 may be in communication with the processing circuitry 12 to receive an indication of a user input and/or to provide an audible, visual, mechanical, or other output to a user. In one embodiment, the user interface may include, for example, a keyboard, a mouse, a joystick, a display, a touch screen display, a microphone, a speaker, and/or other input/output mechanisms. The user interface may be in communication with the memory 14 and/or communication interface 16, such as via a bus.

Referring now to FIG. 3, the operations performed, such as by the apparatus 10 of FIG. 2, in accordance with an example embodiment of the present invention are illustrated. As shown in block 20 of FIG. 3, the apparatus, such as the processing circuitry 12, the communications interface 16 or the like, may be configured to receive a medical image. The medical image may be received from any of a variety of sources, including the system that captured the image, such as a projection modality, e.g, a DR, CR or MG system, or a memory device or other archive that stores medical images. The medical image includes a plurality of pixels having respective pixel values. For example, the pixel values may define the gray level of the respective pixel.

As shown in block 22 of FIG. 3, the apparatus 10, such as the processing circuitry 12, may also be configured to enhance the medical image utilizing an enhancement function. As explained below, the enhancement function may vary depending upon the pixel value of a respective pixel. Thus, the enhancement function does not process all pixels of the medical image in the identical manner, but, instead, differently enhances the pixels of the medical image depending upon the pixel value of the respective pixels, as described below. As such, the apparatus, such as the processing circuitry, enhances the medical image by modifying a representation of the medical image in accordance with the enhancement function.

Referring now to FIG. 4, a more detailed flowchart of the operations performed, such as by the apparatus 10 of FIG. 2, in accordance with an example embodiment of the present invention, are illustrated. As described above, the apparatus, such as the processing circuitry 12, the communications interface 16 or the like, may be configured to receive a medical image formed of a plurality of pixels having respective pixel values. See block 30 of FIG. 4. In accordance with an example embodiment, the method, apparatus and computer program product may enhance the medical image utilizing a form of unsharp masking. For example, as shown in block 32 of FIG. 4, the apparatus, such as the processing circuitry, may be configured to create an unsharp mask of the medical image. In this regard, the medical image may be represented as I(x,y) with x and y representing the coordinates within the medical image of a respective pixel. In order to create an unsharp mask of the medical image, a blurred version of the image may be subtracted from the image to create a blurred image, such as an unsharp mask UM(x,y), as follows:

$$UM(x,y)=I(x,y)-(I(x,y)*G(x,y))$$

wherein G(x,y) represents the Gaussian low pass blur function and * represents a convolution operation.

As shown in block 34 of FIG. 4, the apparatus 10, such as the processing circuitry 12, may also be configured to enhance the medical image utilizing an enhancement function by modifying the unsharp mask in accordance with the enhancement function to create an enhanced blurred image. As described below, the enhancement function may be a piecewise function having a plurality of pieces associated with different respective pixel values, such as different respective ranges of pixel values. However, the enhancement function utilized by other embodiments of the present invention may be defined in other manners with the enhancement function being different depending upon the pixel value of a respective pixel, such as by being different for different ranges of pixel values.

In one embodiment, the enhancement function may be a continuous, monotonically increasing function. The enhancement function of one embodiment may be antisymmetrical in order to preserve the position of local extrema and phase polarity for edge crispening of the sharpened image. For example, the enhancement function of another example embodiment may be a Hurter & Driffield (H & D) curve that is utilized to describe the relationship between optical density and the logarithm of exposure on film. The H & D function is non-symmetric such that different ranges of pixel values may be amplified in different non-linear manners. Alternatively, the enhancement function may be symmetrical. For example, the enhancement function may be a sigmoid (logistic) function, which is symmetrical.

By way of example, but not of limitation, a piecewise linear enhancement function will now be described. In this example embodiment, the piecewise linear enhancement function may be defined as:

$$E(x) = \begin{cases} x-(k-1)T, & x<T \\ kx, & x<|T| \\ x+(k-1)T, & x>T \end{cases}$$

wherein T is the threshold and k is the amplification factor. In this example embodiment, the threshold T may be defined as follows:

$$T=t \cdot \max\{|UM(x,y)|\}$$

Wherein "·" represents a multiplication operation and 0<t<1. By appropriately selecting the value of t, weaker, that is, less visible, features within the medical image may be enhanced. For example, values of t that are smaller, such as between 0 and 0.5 may cause weaker features within the medical image to be favored and effectively enhanced.

As noted above, the unsharp mask UM(x,y) may be modified in accordance with the enhancement function to create an enhanced blurred image. Although the unsharp mask may be modified in various manners by the enhancement function in accordance with example embodiments of the present invention, the apparatus 10, such as the processing circuitry 12, of one example embodiment, modifies the unsharp mask as follows:

$$UM(x,y)-(k-1)T, \text{ if } UM(x,y)<-T$$

$$k \cdot UM(x,y), \text{ if } |UM(x,y)|<T$$

$$UM(x,y)+(k-1)T, \text{ if } UM(x,y)>T$$

As shown in block 36 of FIG. 4, the apparatus 10, such as the processing circuitry 12, of this example embodiment may also be configured to combine the medical image I(x,y) with the enhanced blurred image to create a sharpened image. In accordance with the foregoing embodiment, the processing circuitry may be configured to create the sharpened image S(x,y) as follows:

$$S(x, y) = I(x, y) + \begin{cases} UM(x, y) - (k-1)T, & \text{if } UM < -T \\ k \cdot UM(x, y), & \text{if } |UM| < T \\ UM(x, y) + (k-1)T, & \text{if } UM > T \end{cases}$$

By enhancing the medical image utilizing an enhancement function, the method, apparatus 10 and computer program product of an example embodiment may amplify pixels having different ranges of pixel values in different manners so that different tissue structures within the medical image are correspondingly differently amplified. For example, the enhancement of a medical image utilizing an enhancement function in accordance with an example embodiment of the present invention permits lower contrast areas of the medical image to be enhanced to a greater degree than areas of the medical image that have high contrast. In other words, the weaker edges in the blurred image may be amplified to a greater degree than the sharper edges so as to permit the weaker edges to have increased contrast while avoiding or at least limiting sharp edge blurring effects.

By way of example, an image generated by a chest x-ray of a patient with pneumothorax is shown in FIG. 5. The sharpened image of FIG. 5 is an enhanced representation of the image shown in FIG. 1. As will be recognized, the enhancement of the medical image has enhanced the low contrast areas to a greater degree than the higher contrast areas, such as by more greatly amplifying the weaker edges of the medical image while controlling the sharp edge blurring effect. As such, a user, such as a radiologist, may more efficiently and effectively review the sharpened image and provide diagnostic feedback since the sharpened image provides an improved representation of the patient's lungs and more clearly depicts the pneumothorax.

In order to further enhance the medical image and to eliminate or at least reduce outliers within the sharpened image, such as pixels having values that differ most greatly from the pixel values of the majority of the pixels, the apparatus 10 of one embodiment, such as the processing circuitry 12, may be further configured to determine a cumulative histogram distribution of the sharpened image as shown in block 38 of FIG. 4. Based upon the cumulative histogram distribution, the apparatus, such as the processing circuitry, of this example embodiment may rescale the sharpened image to correspond to an intensity range of the medical image, that is, the intensity range of the medical image that was initially received. See block 40 of FIG. 4. In this regard, the apparatus, such as the processing circuitry, may determine the range of pixel values of the pixels that comprise the medical image that was received. The apparatus, such as the processing circuitry, of this embodiment may then rescale the pixel values of the pixels of the sharpened image as represented by the cumulative histogram distribution to be identical to the intensity range of the medical image that was initially received. Additionally or alternatively, the apparatus, such as the processing circuitry, may eliminate one or more outlier pixels as defined by the cumulative histogram distribution. See also block 40 of FIG. 4. For example, the apparatus, such as the processing circuitry, may be configured to eliminate a predefined percentage of the pixels having pixel values that have the greatest pixel values and a predefined percentage of pixels that have the smallest pixel values. As a result of the elimination of outliers by, for example, resealing of the sharpened image and/or elimination of one or more outlier pixels, the sharpened image may be further enhanced.

In one example embodiment, the sharpened image may be additionally enhanced by applying a contrast limited adapted histogram equalization (CLAHE) function to the sharpened image. In this embodiment, and as shown in block 42 of FIG. 4, the apparatus 10, such as the processing circuitry 12, may be configured to apply the CLAHE function to the sharpened image, thereby generating a sharpened image that is even further enhanced to facilitate review by a user, such as a radiologist.

As described above, FIGS. 3 and 4 illustrate flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a PACS, an imaging system or other computing device and executed by a processor (e.g., the processor 12) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor 12 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of enhancing medical images, the method comprising:
    receiving a medical image comprising a plurality of pixels having respective pixel values;
    creating an unsharp mask UM of the medical image; and
    enhancing, with processing circuitry, the medical image utilizing an enhancement function, wherein the enhancement function varies depending upon the pixel value of a respective pixel of the unsharp mask UM, and wherein enhancing the medical image comprises modifying the unsharp mask UM following creation of the unsharp mask UM in accordance with the enhancement function to create an enhanced blurred image by determining a threshold T based on the unsharp mask UM, determining a relationship of the pixel value of the respective pixel of the unsharp mask UM to the threshold T and then adding or subtracting an additional term that includes and is based upon the threshold T to the pixel value of the respective pixel of the unsharp mask UM dependent upon the relationship of the pixel value of the respective pixel of the unsharp mask UM to the threshold T, and combining the medical image with the enhanced blurred image by adding the enhanced blurred image to the medical image to create a sharpened image.

2. A method according to claim 1 further comprising:
determining a cumulative histogram distribution of the sharpened image; and
rescaling the sharpened image to correspond to an intensity range of the medical image.

3. A method according to claim 1 further comprising:
determining a cumulative histogram distribution of the sharpened image; and
eliminating one or more outlier pixels as defined by the cumulative histogram distribution.

4. A method according to claim 1 further comprising applying a contrast limited adaptive histogram equalization function to the sharpened image.

5. A method according to claim 1 wherein the enhancement function comprises a piecewise function that includes a plurality of pieces associated with different respective pixel values.

6. An apparatus for enhancing medical images, the apparatus comprising processing circuitry configured to:
receive a medical image comprising a plurality of pixels having respective pixel values;
create an unsharp mask UM of the medical image; and
enhance the medical image utilizing an enhancement function, wherein the enhancement function varies depending upon the pixel value of a respective pixel of the unsharp mask UM, and wherein the processing circuitry is configured to enhance the medical image by modifying the unsharp mask UM following creation of the unsharp mask UM in accordance with the enhancement function to create an enhanced blurred image by determining a threshold T based on the unsharp mask UM, determining a relationship of the pixel value of the respective pixel of the unsharp mask UM to the threshold T and then adding or subtracting an additional term that includes and is based upon the threshold T to the pixel value of the respective pixel of the unsharp mask UM dependent upon the relationship of the pixel value of the respective pixel of the unsharp mask UM to the threshold T, and combining the medical image with the enhanced blurred image by adding the enhanced blurred image to the medical image to create a sharpened image.

7. An apparatus according to claim 6 wherein the processing circuitry is further configured to:
determine a cumulative histogram distribution of the sharpened image; and
rescale the sharpened image to correspond to an intensity range of the medical image.

8. An apparatus according to claim 6 wherein the processing circuitry is further configured to:
determine a cumulative histogram distribution of the sharpened image; and
eliminate one or more outlier pixels as defined by the cumulative histogram distribution.

9. An apparatus according to claim 6 wherein the processing circuitry is further configured to apply a contrast limited adaptive histogram equalization function to the sharpened image.

10. An apparatus according to claim 6 wherein the enhancement function comprises a piecewise function that includes a plurality of pieces associated with different respective pixel values.

11. A computer program product for enhancing medical images, the computer program product comprising at least one non-transitory computer-readable storage medium having computer-executable program code portions stored therein, the computer-executable program code portions comprising program code instructions for:
receiving a medical image comprising a plurality of pixels having respective pixel values;
creating an unsharp mask UM of the medical image; and
enhancing the medical image utilizing an enhancement function, wherein the enhancement function varies depending upon the pixel value of a respective pixel of the unsharp mask UM, and wherein the program code instructions for enhancing the medical image comprise program code instructions for modifying the unsharp mask UM following creation of the unsharp mask UM in accordance with the enhancement function to create an enhanced blurred image by determining a threshold T based on the unsharp mask UM, determining a relationship of the pixel value of the respective pixel of the unsharp mask UM to the threshold T and then adding or subtracting an additional term that includes and is based upon the threshold T to the pixel value of the respective pixel of the unsharp mask UM dependent upon the relationship of the pixel value of the respective pixel of the unsharp mask UM to the threshold T, and combining the medical image with the enhanced blurred image by adding the enhanced blurred image to the medical image to create a sharpened image.

12. A computer program product according to claim 11 wherein the computer-executable program code portions further comprise program code instructions for:
determining a cumulative histogram distribution of the sharpened image; and
rescaling the sharpened image to correspond to an intensity range of the medical image.

13. A computer program product according to claim 11 wherein the computer-executable program code portions further comprise program code instructions for:
determining a cumulative histogram distribution of the sharpened image; and
eliminating one or more outlier pixels as defined by the cumulative histogram distribution.

14. A computer program product according to claim 11 wherein the computer-executable program code portions further comprise program code instructions for applying a contrast limited adaptive histogram equalization function to the sharpened image.

15. A computer program product according to claim 11 wherein the enhancement function comprises a piecewise function that includes a plurality of pieces associated with different respective pixel values.

16. A method according to claim 1 wherein the threshold is based upon the pixel values of the unsharp mask UM.

17. An apparatus according to claim 6 wherein the threshold is based upon the pixel values of the unsharp mask UM.

18. A computer program product according to claim 11 wherein the threshold is based upon the pixel values of the unsharp mask UM.

19. A method according to claim 1 wherein the enhancement function $E(x)$ equals $x-f(k,T)$ when $x<-T$; $kx$ when $x<|T|$; and $x+f(k,T)$ when $x>T$, wherein k is an amplification factor and $f(k,T)$ is a function of k and T, and wherein the enhanced blurred image equals $UM-f(k,T)$ when $UM<-T$; $k \cdot UM$ when $UM<|T|$; and $UM+f(k,T)$ when $UM>T$.

20. An apparatus according to claim 6 wherein the enhancement function $E(x)$ equals $x-f(k,T)$ when $x<-T$; $kx$ when $x<|T|$; and $x+f(k,T)$ when $x>T$, wherein k is an amplification factor and $f(k,T)$ is a function of k and T, and wherein the enhanced blurred image equals $UM-f(k,T)$ when $UM<-T$; $k \cdot UM$ when $UM<|T|$; and $UM+f(k,T)$ when $UM>T$.

21. A computer program product according to claim 11 wherein the enhancement function $E(x)$ equals $x-f(k,T)$ when $x<-T$; $kx$ when $x<|T|$; and $x+f(k,T)$ when $x>T$, wherein k is an amplification factor and $f(k,T)$ is a function of k and T, and wherein the enhanced blurred image equals $UM-f(k,T)$ when $UM<-T$; $k \cdot UM$ when $UM<|T|$; and $UM+f(k,T)$ when $UM>T$.

* * * * *